(12) United States Patent
Sinha et al.

(10) Patent No.: US 6,961,432 B1
(45) Date of Patent: Nov. 1, 2005

(54) MULTIDESCRIPTIVE CODING TECHNIQUE FOR MULTISTREAM COMMUNICATION OF SIGNALS

(75) Inventors: Deepen Sinha, Chatham, NJ (US); Carl-Erik Wilhelm Sundberg, Chatham, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/454,027

(22) Filed: Dec. 3, 1999

Related U.S. Application Data (60) Provisional application No. 60/131,581, filed on Apr. 29, 1999.

(51) Int. Cl.[7] ............................. H04H 5/00; H04B 3/00; H04J 3/16
(52) U.S. Cl. ............................. 381/2; 381/80; 370/465; 704/501
(58) Field of Search ............................. 381/1, 2, 16, 20, 381/80, 77; 455/62, 427, 59, 500; 375/240, 375/260, 240.12, 240.06, 231, 295, 242, 375/243, 244, 246, 247, 296; 704/219, 229, 704/500, 501; 370/297, 333, 464, 465; 341/143; 714/746, 820

(56) References Cited

U.S. PATENT DOCUMENTS

| | | | | |
|---|---|---|---|---|
| 4,498,173 A * | 2/1985 | Reudink | ..................... | 714/746 |
| 4,538,234 A * | 8/1985 | Honda et al. | ................ | 704/229 |
| 4,815,132 A * | 3/1989 | Minami | .......................... | 381/1 |
| 5,285,498 A * | 2/1994 | Johnston | ........................ | 381/2 |
| 5,511,093 A * | 4/1996 | Edler et al. | .................. | 375/240 |
| 5,832,379 A * | 11/1998 | Mallinckrodt | ............... | 455/427 |
| 6,240,275 B1 * | 5/2001 | H'Mimy et al. | ............... | 455/62 |
| 6,353,637 B1 * | 3/2002 | Mansour et al. | ............ | 375/260 |
| 6,360,200 B1 * | 3/2002 | Edler et al. | .................. | 704/219 |
| 6,539,357 B1 * | 3/2003 | Sinha | ...................... | 704/270.1 |

OTHER PUBLICATIONS

J. Herre et al., "Combined Stereo Coding," 93rd Convention, Audio Engineering Society, Oct. 1-4, 1992.
R. van der Waal et al., "Subband Coding of Stereophonic Digital Audio Signals," *IEEE*, 1991, pp. 3601-3604.

* cited by examiner

*Primary Examiner*—Huyen Le
*Assistant Examiner*—Andrew Graham (57) ABSTRACT

In a digital audio broadcast system, to utilize transmission bandwidth efficiently, representations of a stereo audio signal for transmission are generated in accordance with an inventive multidescriptive coding technique. The representations, as generated, are then transmitted through multiple communication channels, respectively. The transmitted representations are received by a receiver where one or more of the representations are selected for recovery of the stereo audio signal. Because of the design of the multidescriptive coding used, the more representations are selected to recover the stereo audio signal, the higher the quality of the recovered signal.

46 Claims, 3 Drawing Sheets

MULTIDESCRIPTIVE CODING TECHNIQUE FOR MULTISTREAM COMMUNICATION OF SIGNALS

The present application claims the priority of U.S. provisional patent application Ser. No. 60/131,581, filed Apr. 29, 1999 in the name of inventors D. Sinha et al. and entitled "Multidescriptive Coding for Two Path Satellite Broadcasting."

FIELD OF THE INVENTION

The invention relates to communications systems and methods, and more particularly to systems and methods for communicating signals through multiple communication channels.

BACKGROUND OF THE INVENTION

Communication of audio signals plays an important role in radio and TV broadcast. With the advent of digital technology, terrestrial and satellite digital audio broadcast (DAB) systems have been proposed. In prior art, to efficiently utilize transmission bandwidth to communicate audio signals, a perceptual audio coding (PAC) technique is often employed. For details on the PAC technique, one may refer to U.S. Pat. No. 5,285,498 issued Feb. 8, 1994 to Johnston; and U.S. Pat. No. 5,040,217 issued Aug. 13, 1991 to Brandenburg et al., both of which are hereby incorporated by reference. In accordance with such a PAC technique, each of a succession of time domain blocks of an audio signal representing audio information is coded in the frequency domain. Specifically, the frequency domain representation of each block is divided into coder bands, each of which is individually coded, based on psycho-acoustic criteria, in such a way that the audio information is significantly compressed, thereby requiring a smaller number of bits to represent the audio information than would be the case if the audio information were represented in a more simplistic digital format, such as the PCM format.

In many broadcast systems including the aforementioned DAB systems, it is possible to transmit audio signals over multiple alternative channels, which are simultaneously available for signal transmission. In prior art, in anticipation of a loss or significant degradation of a transmitted signal because of imperfect channel conditions, multiple alternative channels are typically used to transmit duplicate signals, respectively, to realize path diversity, thereby improving the accuracy of recovery of the transmitted signal. An example for a realization of path diversity may be broadcasting duplicate digital audio signals via multiple satellites in a satellite DAB system.

SUMMARY OF THE INVENTION

We have recognized that the above-described use of multiple alternative channels in prior art represents an inefficient utilization of transmission bandwidth especially when the communication channels are relatively reliable, as are those in a DAB system, e.g., the satellite DAB system.

In accordance with the invention, to utilize transmission bandwidth efficiently, multidescriptive representations of a signal for transmission are generated, and the representations are transmitted through the respective alternative channels, thereby realizing a "multistream" transmission. In general, the more representations are received and used to recover the signal, the higher the quality of the recovered signal.

For example, in a DAB system, in communicating a stereo audio signal which includes a left channel signal and a right channel signal, at least a first multidescriptive representation and a second multidescriptive representation of the signal are generated in accordance with the invention, and then transmitted through the respective alternative channels in the system. The first representation contains first information concerning at least the left channel signal, and second information concerning at least a first coefficient for predicting the right channel signal based on the first information. Similarly, the second representation containing third information concerning at least the right channel signal, and fourth information concerning at least a second coefficient for predicting the left channel signal based on the third information.

One or more of the transmitted multidescriptive representations of the stereo audio signal received from the channels may be selected for recovering the signal. For example, when the first (second) representation is selected for the signal recovery, the recovered signal includes a recovered left (right) channel signal based on the first (third) information, and a prediction of the transmitted right (left) channel signal based on the first (second) coefficient in the representation, thereby affording an acceptable stereo audio quality. When both the first and second representations are selected for the signal recovery, the recovered signal includes recovered left and right channel signals based on the first and third information in the respective representations, thereby affording a higher stereo audio quality.

DETAILED DESCRIPTION

Figure 1:
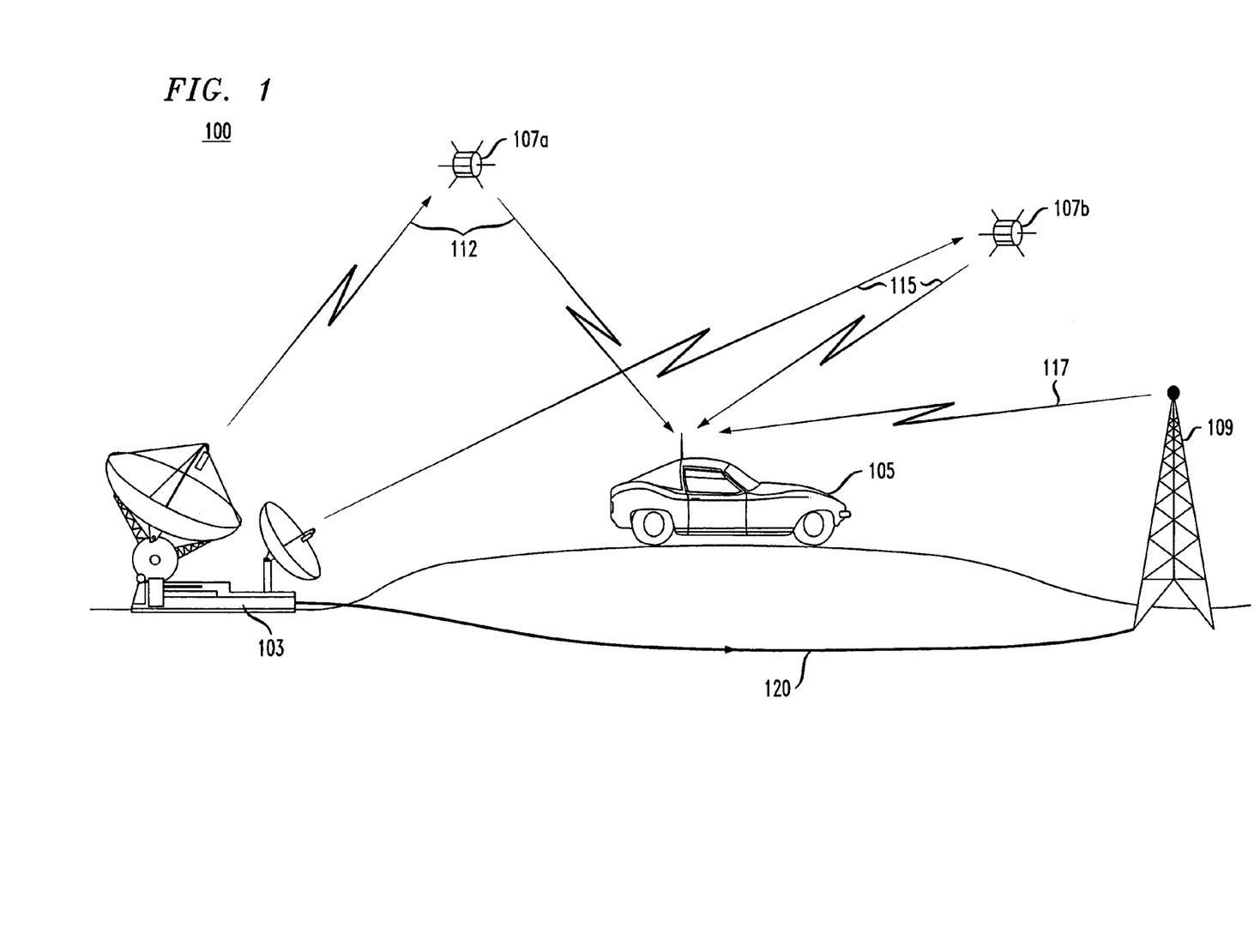
FIG. 1 illustrates a satellite digital audio broadcast arrangement in accordance with the invention.

FIG. 1 illustrates digital broadcast arrangement 100 embodying the principles of the invention, e.g., a satellite digital audio broadcast (DAB) arrangement in this instance. In arrangement 100, control station 103 generates DAB signals containing, e.g., stereo audio information, and transmits the signals through multiple alternative channels which are simultaneously available for signal transmission. For example, mobile 105, including therein a receiver described below, may receive the transmitted DAB signals from control station 103 via satellite links 112 and 115 through satellites 107a and 107b, respectively, and/or radio frequency (RF) link 117 through terrestrial antenna 109. However, in this particular illustrative embodiment, the terrestrial transmission serves as a "gap filler" or, in other words, substitute for the satellite transmissions in areas where the satellite transmissions cannot reach. To that end, DAB signals containing the stereo audio information are transported from control station 103 through cable 120, e.g., a T1 line, to terrestrial antenna 109 located in one such area.

In prior art, multiple alternative channels are typically used to transmit duplicate copies of a signal, respectively, to realize path diversity in anticipation of a loss or significant degradation of the transmitted signal due to imperfect channel conditions, thereby improving the accuracy of recovery of the transmitted signal. However, we have recognized that such prior art use of the multiple alternative channels represents an inefficient utilization of transmission bandwidth especially when the communication channels are relatively reliable, as are satellite links 112 and 115 in arrangement 100.

In accordance with the invention, to utilize transmission bandwidth efficiently, multidescriptive representations of a signal for transmission are generated, and the representations are transmitted through the respective alternative channels. In general, the more representations are received and used to recover the signal, the higher the quality (e.g., based on a signal-to-noise ratio or perceptually based measure) of the recovered signal.

Specifically, in this illustrative embodiment, two multidescriptive representations, referred to as "D1 and D2 representations", are used to represent stereo audio information, and the D1 and D2 representations are transmitted through satellite links 112 and 115, respectively. Because of the design of the multidescriptive coding described below, the audio signal recovered based on the D1 representation or D2 representation alone affords an acceptable stereo audio quality. The audio signal recovered based on both the D1 and D2 representations affords a relatively high stereo audio quality.

Figure 2:
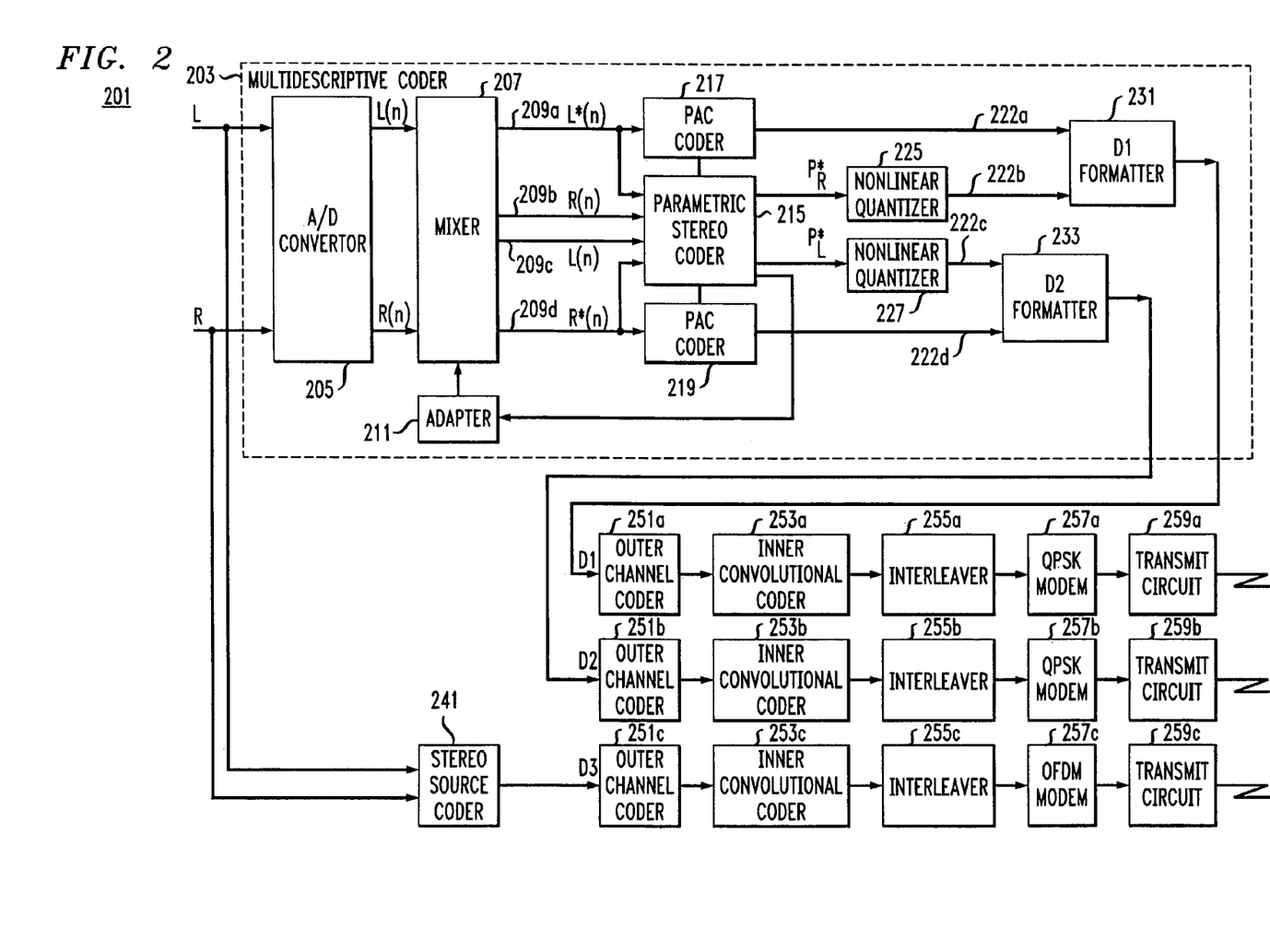
FIG. 2 is a block diagram of a transmitter for transmitting a stereo audio signal in the arrangement of FIG. 1.

FIG. 2 illustrates transmitter 201 in control station 103 for generating and transmitting the D1 and D2 representations in accordance with the invention through satellite links 112 and 115, respectively, and the aforementioned gap filler signal through RF link 117. The D1 and D2 representations contains information concerning an analog stereo audio signal for transmission, which in a conventional manner consists of left channel signal L and right channel signal R, which are fed to transmitter 201. In accordance with the inventive multidescriptive coding technique, for example, the D1 representation contains (i) information concerning L, and (ii) parametric information concerning R (denoted "param-R") resulting from parametric stereo coding of R with respect to L. Because of the design of the stereo parametric coding described below, R can be predicted based on the param-R and L information. As a result, the stereo audio signal recovered based on the D1 representation alone includes L and a prediction of R, affording an acceptable stereo audio quality, where L is derived from the L information in the D1 representation, and the prediction of R is derived from both the param-R and L information therein.

Similarly, the D2 representation contains (i) information concerning R, and (ii) parametric information concerning L (denoted param-L) resulting from parametric stereo coding of L with respect to R. Because of the design of the parametric stereo coding, L can be predicted based on the param-L and R information. As a result, the stereo audio signal recovered based on the D2 representation alone includes R and a prediction of L, affording an acceptable stereo audio quality, where R is derived from the R information in the D2 representation, and the prediction of L is derived from both the param-L and R information therein.

In addition, the stereo audio signal recovered based on both the D1 and D2 representations includes L derived from the L information in the D1 representation, and R derived from the R information in the D2 representation, affording a relatively high stereo audio quality. The redundant param-R and param-L information in the respective D1 and D2 representations may further be utilized for additional high frequency stereo image correction to afford an even higher stereo audio quality.

The above parametric stereo coding is predicated upon an observation that in frequency domain the content of L can be predicted from that of R, and vice versa. Thus, without loss of generality, param-R in the D1 representation may be derived based on the following relation:

$$R_f = \alpha L_f,  \quad (1)$$

where $R_f$ represents the frequency spectrum of R, $L_f$ represents the frequency spectrum of L, and $\alpha$ represents a predictor coefficient from which param-R is derived. To improve the prediction of $R_f$ based on $L_f$ in (1), multiple predictor coefficients across the frequency range may be used, and hence:

$$R_f^i = \alpha^i L_f^i, \quad (2)$$

where i represents an index for an $i^{th}$ prediction frequency band in the frequency range. For example, where a perceptual audio coding (PAC) technique is applied to an audio signal, which is the case here and described below, each $i^{th}$ prediction frequency band may coincide with a different one of the coder bands which approximate the well known critical bands of the human auditory system, in accordance with the PAC technique.

Referring to expression (2); the success of predicting $R_f^i$ depends on how well the predictor coefficients, $\alpha^i$, can capture the stereo cues in the signal. As is well known, stereo localization is based on both magnitude and phase cues. An enhanced prediction scheme for well capturing both magnitude and phase cues will now be described. This scheme relies on imposing some constraints on L and R so that both magnitude information and phase information thereof are available in a single domain to perform the prediction. It is well known in the signal processing theory that if a real signal satisfies a "causality constraint," the real part of the signal spectrum provides a sufficient representation thereof as the imaginary part of the spectrum may be recovered based on the real part without any additional information. Thus, the enhanced prediction scheme in question may be mathematically expressed as follows:

$$R_{f\,real-causal}^i = \alpha^i L_{f\,real-causal}^i. \quad (3)$$

Based on expression (3), the aforementioned parametric stereo coding is achieved by computing the predictor coefficients $\alpha^i$ from the real parts of $L_f^i$ and $R_f^i$ after the causality constraints are respectively imposed onto L and R in the time domain, and param-R comprises information concerning $\alpha^i$ for each $i^{th}$ prediction frequency band.

It should be pointed out at this juncture that in practice, the imposition of a causality constraint on L (or R) in the time domain is readily accomplished by zero padding the samples representing L (or R). Thus, in a well known manner, $L_{f\,real-causal}^i$ (or $R_{f\,real-causal}^i$) is realized by appending "zeros" to a block of N samples representing L to lengthen the block to (2N−1) samples long, followed by a frequency transform of the zero-padded block and extraction of the real part of the resulting transform, where N is a predetermined number.

For an even more enhanced prediction, a multi-tap predictor may be utilized whereby $\alpha^i$ represents a set of predictor coefficients for an $i^{th}$ prediction frequency band. For example, where a 2-tap predictor is used, $\alpha^i = [\alpha_0^i \alpha_1^i]$ which may be expressed as follows:

$$r = \alpha_0^i l + \alpha_1^i l', \quad (4)$$

where r represents the set of real parts of the frequency components in $R_{f\,real-causal}^i$ in the $i^{th}$ prediction band, l represents the set of real parts of the frequency components in $L^i_{f\,real-causal}$ in the $i^{th}$ prediction band, l' represents the set of real parts of the frequency components in $L^i_{f\,real-causal}$ in the $(i-1)^{th}$ prediction band. As such, the predictor coefficients $\alpha^i_0$ and $\alpha^i_1$ may be determined by solving the following equation:

$$\begin{pmatrix} l^T l & l^T l' \\ l'^T l' & l'^T l' \end{pmatrix} \begin{pmatrix} \alpha^i_0 \\ \alpha^i_1 \end{pmatrix} = \begin{pmatrix} l^T r \\ l'^T r \end{pmatrix}, \quad (5)$$

where the superscript "T" denotes a standard matrix transposition operation. Thus, $$\begin{pmatrix} \alpha^i_0 \\ \alpha^i_1 \end{pmatrix} = G^{-1} H, \quad (6)$$

where $$G = \begin{pmatrix} l^T l & l^T l' \\ l'^T l' & l'^T l' \end{pmatrix};$$

$$H = \begin{pmatrix} l^T r \\ l'^T r \end{pmatrix};$$

and the superscript "−1", denotes a standard matrix inverse operation.

In this illustrative embodiment, param-R in the D1 representation comprises information concerning predictor coefficients $\alpha^i_0$ and $\alpha^i_1$ for predicting R based on the L information in the D1 representation. Based on the disclosure heretofore, it is apparent to a person skilled in the art that param-L in the D2 representation comprises information concerning predictor coefficients $\beta^i_0$ and $\beta^i_1$ for predicting L based on the R information in the D2 representation, where $\beta^i_0$ and $\beta^i_1$ are obtained similarly to $\alpha^i_0$ and $\alpha^i_1$ using equation [6] with "l" and "r" interchanged.

For example, if each alternative communication channel affords a bit rate of 64 kbps, for the D1 representation, 56–60 kbps may be allocated to the transmission of the L information and 4–8 kbps to the transmission of param-R. Similarly, for the D2 representation, 56–60 kbps may be allocated to the transmission of the R information, and 4–8 kbps to the transmission of param-L.

Referring back to equation (6), it can be shown that if L is weak, and thus det G (i.e, determinant of G) has a small value, equation (6) for solving $\alpha^i_0$ and $\alpha^i_1$ would be numerically ill conditioned. As a consequence, use of the resulting $\alpha^i_0$ and $\alpha^i_1$, and thus param-R, to predict R based on L is not viable.

To avoid the numerically ill condition in (6), a second multidescriptive coding technique in accordance with the invention will now be described. According to this second technique, the D1 representation contains (i) information concerning L*, and (ii) parametric information concerning R resulting from parametric stereo coding of R with respect to L*, denoted param-R[w.r.t. L*], where, e.g., $$L^* = aL + bR, \quad (7)$$

where a+b=1 and a>>b≦0. In addition, the D2 representation contains (i) information concerning R*, and (ii) parametric information concerning L resulting from parametric stereo coding of L with respect to R*, denoted param-L [w.r.t. R*], where, e.g., $$R^* = aR - bL. \quad (8)$$

It should be noted that the multidescriptive coding technique previously described is merely a special case of the second technique with a=1 and b=0. In any event, the disclosure hereupon is based on the generalized, second multidescriptive coding technique involving R* and L*.

It should also be noted that it may be more advantageous to employ the generalized multidescriptive coding technique especially when a stereo signal includes an extremely strong stereo tilt (i.e., almost completely dominated by either L or R). By controlling the a and b values, the pair L* and R* in accordance with the generalized technique exhibits a reduced stereo separation, thereby increasing the "naturalness" of the parametric stereo coding. If both the D1 and D2 representations are used for signal recovery, the R and L pair can be reconstructed based on the R* and L* information in the D1 and D2 representations, respectively. When the D1 (or D2) representation alone is used for signal recovery, the prediction of R (or L) based on param-R[w.r.t. L*] (or param-L[w.r.t. R*]) in the D1 (or D2) representation leads to a more natural audio effect. As fully described below, the a and b values are adaptively selected depending on the specific L and R values. Similarly, if each alternative communication channel affords a bit rate of 64 kbps, for the D1 (or D2) representation, 56–60 kbps may be allocated to the transmission of the L* (or R*) information, and 4–8 kbps to the transmission of param-R[w.r.t. L*] (or param-L[w.r.t. R*]).

Referring back to FIG. 2., the aforementioned L and R are fed to multidescriptive coder 203 in transmitter 201. In response, analog-to-digital (A/D) convertor 205 in coder 203 digitizes L and R, thereby providing PCM samples of L and R denoted L(n) and R(n), respectively, where n represents an index for an $n^{th}$ sample interval. Based on L(n) and R(n), mixer 207 generates L*(n) on lead 209a in accordance with expression (7) above, and R*(n) on lead 209d in accordance with expression (8) above, where values of a and b are adaptively selected by adapter 211 described below. In addition, R(n) and L(n) bypass mixer 207 onto leads 209b and 209c, respectively. Leads 209a–209d extend, and thereby provide the respective L*(n), R(n), L(n) and R*(n), to parametric stereo coder 215 described below. L*(n) and R*(n) are also provided to PAC coder 217 and 219, respectively.

In a conventional manner, PAC coder 217 divides the PCM samples L*(n) into time domain blocks, and performs a modified discrete cosine transform (MDCT) on each block to provide a frequency domain representation therefor. The resulting MDCT coefficients are grouped according to coder bands for quantization. As mentioned before, these coder bands approximate the well known critical bands of the human auditory system. PAC coder 217 also analyzes the audio signal samples, L*(n), to determine the appropriate level of quantization (i.e., quantization stepsize) for each coder band. This level of quantization is determined based on an assessment of how well the audio signal in a given coder band masks noise. The quantized MDCT coefficients then undergo a conventional Huffman compression process, resulting in a bit stream representing L* on lead 222a. Similarly, PAC coder 219 processes the PCM samples R*(n), resulting in another bit stream representing R* on lead 222d.

Based on received L*(n) and R(n), parametric stereo coder 215 generates parametric signals $P^*_R$. Similarly, based on received R*(n) and L(n), coder 215 generates $P^*_L$. Signal $P^*_R$ contains information concerning param-R[w.r.t. L*] which comprises predictor coefficients $\alpha^i_0$ and $\alpha^i_1$, in accordance with equation (6) above, although "l" and "l'" therein are derived from L* here, rather than L, pursuant to the generalized multidescriptive coding technique. Similarly, signal $P^*_L$ contains information concerning param-L[w.r.t. R*] which comprises predictor coefficients $\beta^i_0$ and $\beta^i_1$ (replacing $\alpha^i_0$ and $\alpha^i_1$) in accordance with equation (6) with "l" and "r" therein interchanged and with the resulting "r" and "r'" derived from R*, rather than R, pursuant to the generalized multidescriptive coding technique.

Signals $P^*_R$ and $P^*_L$ are quantized by conventional nonlinear quantizers 225 and 227, respectively, thereby providing a bit stream representing $P^*_R$ on lead 222b, and another bit stream representing $P^*_L$ on lead 222c. Leads 222a and 222b extend to D1 formatter 231 where for each time domain block, the bit stream representing $P^*_R$ on lead 222b corresponding to the time domain block is appended to that representing L* on lead 222a corresponding to the same time domain block, resulting in the aforementioned D1 representation. Similarly, leads 222c and 222d extend to D2 formatter 233 where the bit stream representing $P^*_L$ on lead 222c is appended to that representing R* on lead 222d, resulting in the aforementioned D2 representation.

The adaptation algorithm implemented by adapter 211 for selecting the values of a and b will now be described. This adaptation algorithm involves finding a smooth estimate of an upcoming value of $a=a_{cur+1}$, which is a function of the current time domain blocks of L*(n) and R*(n) being processed by parametric stereo coder 215, in accordance with the following iterative process:

$$a_{cur+1} = \gamma \epsilon_{cur} + (1-\gamma)a_{cur}, \quad (9)$$

and $$a_0 = 1,$$

where cur represents an iterative index greater than or equal to zero; γ represents a constant having a value close to one, e.g., γ=0.95 in this instance; and $\epsilon_{cur}$ is defined as follows:

$$\varepsilon_{cur} = 0.5 + 0.5 \left| \frac{\mathcal{L}^*(f) \cdot \mathcal{R}^*(f)}{\|\mathcal{L}^*(f)\| \, \|\mathcal{R}^*(f)\|} \right|,$$

where $\mathcal{L}^*(f)$ and $\mathcal{R}^*(f)$ respectively are spectrum representations of the current time domain blocks of L*(n) and R*(n) in the form of vectors; "·" represents a standard inner product operation; and $\|\mathcal{L}^*(f)\|$ and $\|\mathcal{R}^*(f)\|$ represent the magnitudes of $\mathcal{L}^*(f)$ and $\mathcal{R}^*(f)$, respectively.

Since a+b=1 as mentioned before, the value selected by adapter 211 for b simply equals 1−a. It should be noted that alternatively, a and b may be predetermined constant values, thereby obviating the need of adapter 211.

The aforementioned gap-filler signal is realized by encoding L and R using conventional stereo source coder 241. The resulting bit stream from coder 241 is hereinafter referred to as a "D3 representation."

The D1, D2 and D3 representations are fed to outer channel coder 251a, outer channel coder 251b and outer channel coder 251c, respectively. Outer channel coder 251a encodes the D1 representation according to a well known forward error correction coding technique, e.g., the Reed Solomon coding technique in this instance, or alternatively a binary cyclic redundancy check (CRC) block coding technique, to afford correction and/or detection of errors in the D1 representation after its transmission. The D1 representation is processed by coder 251a on a block by block basis, with each block having a predetermined number of bits. In a conventional manner, coder 251a appends the Reed Solomon check symbols resulting from the encoding of each corresponding block. Similarly, coders 251b and 251c respectively processes the D2 and D3 representations on a block by block basis, and append Reed Solomon check symbols to each corresponding block of the representations for error correction and/or detection purposes.

The Reed Solomon coded D1 representation, Reed Solomon coded D2 representation and Reed Solomon coded D3 representation are fed to inner convolutional coders 253a, 253b and 253c, respectively. Inner convolutional coder 253a processes the received Reed Solomon coded D1 representation on a symbol (different from a Reed Solomon check symbol) interval by symbol interval basis, where the symbol interval has a predetermined duration $T_1$.

Coder 253a encodes the received bit stream in accordance with a well known convolutional code to provide the communications system with a so-called "coding gain" which manifests itself in the form of enhance immunity to such random channel impairments as additive noise, without sacrificing the source bit rate or additional broadcast bandwidth. Specifically, coder 253a introduces redundancy into the received bit stream in accordance with the convolutional code to allow use of a maximum likelihood decoding technique at receiver 303 in FIG. 3 to be described. During each symbol interval, coder 253a forms an encoded word, which includes bits from the received Reed Solomon coded D1 representation and is used to select a symbol from a signal constellation in accordance with a well known digital modulation scheme, e.g., a quaternary phase shift keying (QPSK) scheme. Specifically, the symbols in a QPSK signal constellation each have the same signal level but their phases are spaced π/2 radians apart. The selected symbols from coder 253a are interleaved by interleaver 255a to pseudo-randomize the symbols. QPSK modem 257a processes the symbols from interleaver 255a and generates digitally modulated signals corresponding to such symbols. The digitally modulated signals are transmitted by transmit circuit 259a via satellite link 112. Transmit circuit 259a includes, e.g., a satellite up-converter, a power amplifier, a satellite antenna, etc., all of conventional design.

Similarly, during each symbol interval $T_2$ (in this instance, $T_1=T_2$), inner convolutional coder 253b forms an encoded word, which includes bits from the received Reed Solomon coded D2 representation and is used to select a symbol from a second QPSK signal constellation. The resulting sequence of selected symbols are interleaved by interleaver 255b to pseudo-randomize the symbols. QPSK modem 257b processes the symbols from interleaver 255b and generates digitally modulated signals corresponding to such symbols. The digitally modulated signals are transmitted via satellite link 115 by transmit circuit 259b, which includes, e.g., a satellite up-converter, a power amplifier, a satellite antenna, etc., all of conventional design.

In addition, during each symbol interval $T_3$, inner convolutional coder 253c similarly forms an encoded word, which includes the received Reed Solomon coded D3 representation and is used to select a symbol from a third predetermined signal constellation, which may not be a QPSK signal constellation in this instance. The resulting sequence of selected symbols are interleaved by interleaver 255c to pseudo-randomize the symbols. During each time frame which is $KT_3$ long, OFDM modem 257c transmits K symbols from interleaver 255c in accordance with the well known orthogonal frequency division multiplexed (OFDM) scheme, where K is a predetermined number. In a well known manner, modem 257c generates K pulse shaping carriers corresponding to the $K_3$ symbols. The resulting pulse shaping carriers are transmitted via RF link 117 by transmit circuit 259c, which includes, e.g., an RF up-converter, a power amplifier, terrestrial antenna 109, etc., all of conventional design.

Figure 3:
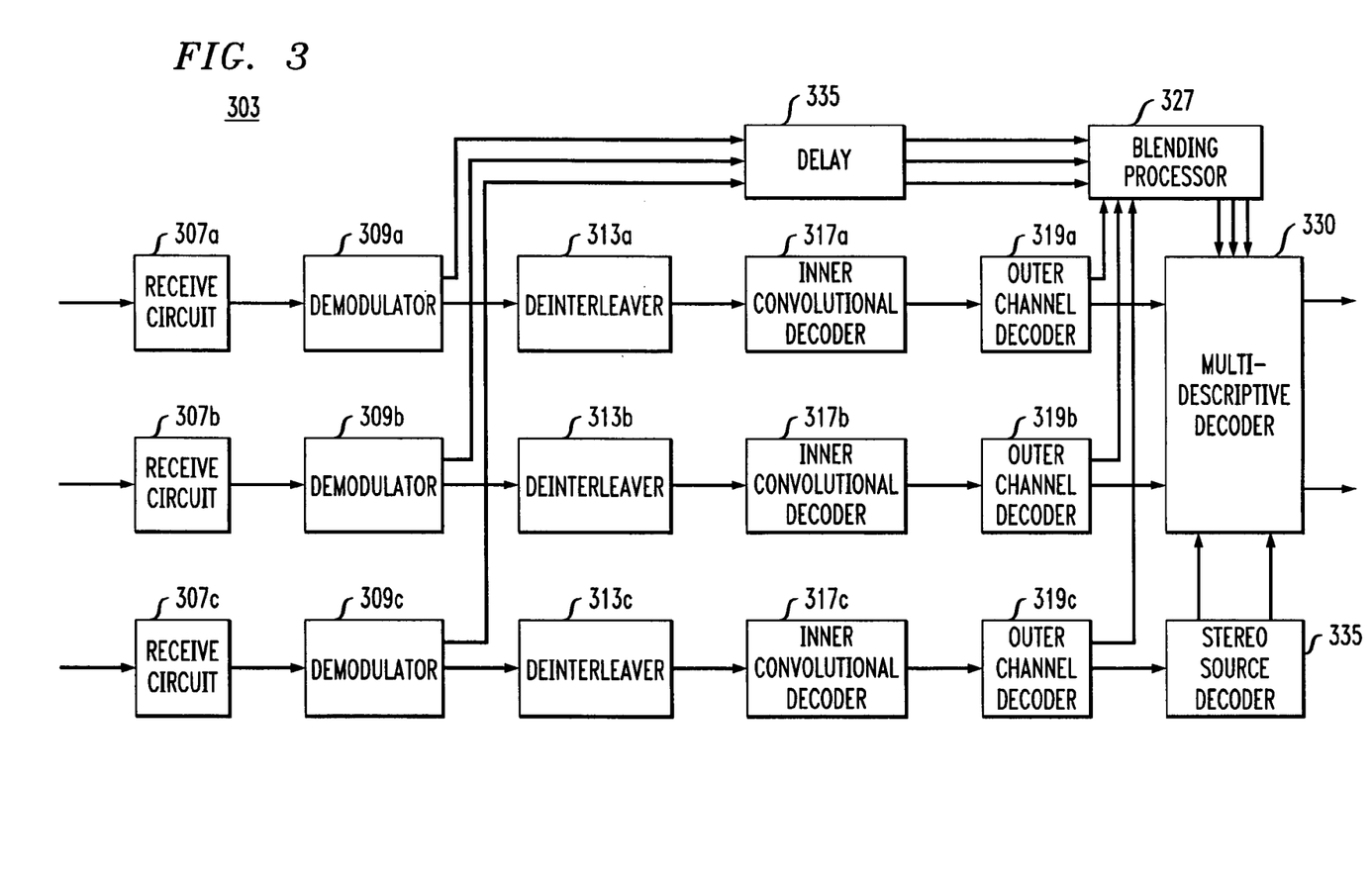
FIG. 3 is a block diagram of a receiver for recovering the transmitted stereo audio signal in the arrangement of FIG. 1.

Referring to FIG. 3, receiver 303 which resides in mobile 105 receives signals transmitted by transmitter 201 through satellite links 112 and 115, and/or RF link 117. The received signals corresponding to the D1 representation, D2 representation and D3 representation are processed by receive circuits 307a, 307b and 307c, which perform inverse functions to above-described transmit circuits 259a, 259b and 259c, respectively. The output of circuit 307a comprises the digitally modulated signals as transmitted by transmit circuit 259a, which are fed to demodulator 309a. Accordingly, demodulator 309a generates a sequence of symbols corresponding to the D1 representation. The generated symbols are de-interleaved by de-interleaver 313a which performs the inverse function to interleaver 255a described above. Based on the de-interleaved symbols and the corresponding signal constellation used, inner convolutional decoder 217a in a conventional manner determines what the most likely transmitted symbols are, thereby recovering the D1 representation incorporating Reed Solomon check symbols therein, i.e., the Reed Solomon coded D1 representation. Outer channel decoder 219a extracts the Reed Solomon check symbols from blocks of the Reed Solomon coded D1 representation, and examines the Reed Solomon check symbols in connection with the corresponding blocks of the D1 representation. Each block of the D1 representation may be corrupted and contain errors because of channel imperfections, e.g., interference in satellite link 112. If the number of errors in each block is smaller than a threshold whose value depends on the actual Reed Solomon coding technique used, decoder 319a corrects the errors in the block. However, if the number of errors in each block is larger than the threshold and the errors are detected by decoder 319a, the latter issues, to blending processor 327 described below, a first flag indicating the error detection. Decoder 319a then provides the recovered D1 representation to multidescriptive decoder 230.

Similarly, the output of circuit 307b comprises the digitally modulated signals corresponding to the D2 representation, which are fed to demodulator 309b. Accordingly, demodulator 309b generates a sequence of symbols corresponding to the D2 representation. The generated symbols are de-interleaved by de-interleaver 313b which performs the inverse function to interleaver 255b described above. Based on the de-interleaved symbols and the corresponding signal constellation used, inner convolutional decoder 317b in a conventional manner determines what the most likely transmitted symbols are, thereby recovering the D2 representation incorporating Reed Solomon check symbols therein, i.e., the Reed Solomon coded D2 representation. Outer channel decoder 219b extracts the Reed Solomon check symbols from blocks of the Reed Solomon coded D2 representation, and examines the Reed Solomon check symbols in connection with the corresponding blocks of the D2 representation. Each block of the D2 representation may be corrupted and contain errors because of channel imperfections. If the number of errors in each block is smaller than the aforementioned threshold, decoder 319b corrects the errors in the block. However, if the number of errors in each block is larger than the threshold and the errors are detected by decoder 319b, the latter issues, to blending processor 327, a second flag indicating the error detection. Decoder 319b then provides the recovered D2 representation to multidescriptive decoder 330.

In addition, the output of circuit 307c comprises the K pulse shaping carriers corresponding to the D3 representation, which are fed to demodulator 309c. Accordingly, demodulator 309c generates a sequence of K symbols corresponding to the D3 representation. The generated symbols are de-interleaved by de-interleaver 313c which performs the inverse function to interleaver 255c described above. Based on the de-interleaved symbols and the corresponding signal constellation used, inner convolutional decoder 317c in a conventional manner determines what the most likely transmitted symbols are, thereby recovering the D3 representation incorporating Reed Solomon check symbols therein, i.e., the Reed Solomon coded D3 representation. Outer channel decoder 319c extracts the Reed Solomon check symbols from blocks of the Reed Solomon coded D3 representation, and examines the Reed Solomon check symbols in connection with the corresponding blocks of the D3 representation. Each block of the D3 representation may be corrupted and contain errors because of channel imperfections. If the number of errors in each block is smaller than the aforementioned threshold, decoder 319c corrects the errors in the block. However, if the number of errors in each block is larger than the threshold and the errors are detected by decoder 319c, the latter issues, to blending processor 327, a third flag indicating the error detection. Decoder 319c then provides the recovered D3 representation to conventional stereo source decoder 335. By performing the inverse function to stereo source coder 241 described above, decoder 335 recovers the stereo audio signal which has components corresponding to L and R and which serves as a gap filler as mentioned before. The gap-filler stereo audio signal is further processed by multidescriptive decoder 330.

Multidescriptive decoder 330, among others, performs the inverse function to multidescriptive coder 203 described above and is capable of blending the received D1 representation and D2 representation to recover the transmitted stereo audio signal. However, blending processor 327 determines whether the D1 representation is to be blended with the D2-representation in decoder 330, and whether the gap-filler stereo audio signal, if any, from stereo source decoder 335 is used for the output. Such a determination is based on measures of data integrity of the D1 representation, D2 representation and D3 representation. To that end, processor 527 provides first, second and third control signals indicative of the determinations of use of the D1 representation and/or D2 representation in decoder 330 to recover the stereo audio signal, or the gap filler stereo audio signal corresponding to the D3 representation for the output. In response to such control signals, decoder 330 accordingly (a) utilizes either the D1 representation or D2 representation to recover the stereo audio signal to afford an acceptable stereo audio quality, (b) utilizes both the D1 representation and D2 representation to recover the stereo audio signal to afford a higher stereo audio quality, (c) recovers no stereo audio signal based on D1 representation and/or D2 representation, and utilizes the gap-filler stereo audio signal for the output, or (d) recovers no stereo audio signal, utilizes no gap-filler stereo audio signal for the output especially where no such gap-filler signal is provided, and, instead, performs well known audio concealment for the current symbol intervals, e.g., interpolation based on the results of audio recovery in neighboring symbol intervals.

The measures based on which processor 327 determines whether any of the D1 representation and D2 representation is used in recovering the stereo audio signal, and whether any gap-filler stereo audio signal corresponding to the D3 representation is used for the output include, e.g., the frequencies of the first, second and third flags received by processor 327, which are indicative of bit errors in the received D1 representation, D2 representation and D3 representation, respectively. The actual frequency threshold beyond which the corresponding representation is rejected depends on the bit rate of the representation, output quality requirements, etc.

The aforementioned measures may also include an estimate of a signal-to-interference ratio concerning each channel obtained during periodic training of each of modems 257a, 257b and 257c. Since these modems may implement multilevel signaling and operate in varying channel conditions, a training sequence with known symbols is used for equalization and level adjustments in demodulators 309a, 309b and 309c periodically. Such a training sequence can be used to estimate the signal-to-interference ratio. With QPSK signaling, an automatic gain control (AGC) or some receiver signal measurement may alternatively be used. When such an estimate goes below an acceptable threshold, blending processor 327 receives an exceptional signal from the corresponding demodulator. In response to the exceptional signal, and depending on other measures, processor 327 may issue a control signal concerning the representation associated with the demodulator to cause decoder 330 to reject the representation. As the exceptional signal needs to be time aligned with the portion of the representation affected by the substandard signal-to-interference ratio, delay element 335 is employed to compensate for the delay imparted to such a representation portion in traversing the deinterleaver and intervening decoders.

The foregoing merely illustrates the principles of the invention. It will thus be appreciated that those skilled in the art will be able to devise numerous other schemes which embody the principles of the invention and are thus within its spirit and scope.

For example, it will be appreciated that in recovering the stereo audio signal, the D3 representation may be blended with either D1 or D2 representation. In that case, the D3 representation may add stereo information to, and/or reduce the quantization noise in, the D1 representation (or D2 representation) for an increased stereo audio quality.

It will also be appreciated that there may be no gap filler signal and thus no D3 representation in certain locations.

In addition, in the illustrative embodiment, D1 and D2 representations are transmitted in accordance with a QPSK scheme. It will be appreciated that one skilled in the art may utilize instead other schemes such as a trellis coded modulation (TCM) scheme with higher order modulation such as 8-PSK, etc.

Moreover, the invention is illustrated in the context of a satellite broadcast system. However, the inventive multidescriptive coding technique described above may also be applied to other communications and broadcast systems, e.g., terrestrial FM and AM, and Internet broadcast systems. For example, the representations resulting from the inventive multidescriptive coding may be respectively transmitted in bands adjacent to and on either side of the power spectrum of a host analog FM signal, in accordance with a prior art in band on channel (IBOC) scheme. In addition, the inventive multidescriptive coding technique may be used in conjunction with the quantizer based multidescriptive technique disclosed in the commonly assigned U.S. application Ser. No. 09/280,280, filed on Mar. 29, 1999.

Further, the multidescriptive representations of a signal, e.g., the D1 and D2 representations, in accordance with the invention may be transmitted through the same communication channel, e.g., the same satellite link, with a time delay for achieving robustness against short time outages.

Finally, transmitter 201 and receiver 303 are disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for communicating a signal over a plurality of communication channels, the signal including at least a first component and a second component, the apparatus comprising:

a processor for generating at least a first representation and a second representation of the signal, the first representation containing first information concerning at least the first component, and second information concerning at least one coefficient for predicting the second component based on the first information, the second representation containing third information concerning at least the second component, and fourth information concerning at least one coefficient for predicting the first component based on the third information; and an output device for transmitting the first representation and the second representation through the communication channels.

2. The apparatus of claim 1 wherein the signal includes a stereo audio signal.

3. The apparatus of claim 2 wherein the first component includes a left channel signal of the stereo audio signal, and the second component includes a right channel signal thereof.

4. The apparatus of claim 1 wherein the first information concerns a combination of the first component and the second component.

5. The apparatus of claim 4 wherein the combination of the first component and the second component is adaptively determined.

6. The apparatus of claim 1 wherein the third information concerns a combination of the first component and the second component.

7. The apparatus of claim 6 wherein the combination of the first component and the second component is adaptively determined.

8. Apparatus for recovering a signal including at least a first component and a second component, the apparatus comprising:

a receiver for receiving at least a first representation and a second representation of the signal, the first representation containing first information concerning at least the first component, and second information concerning at least one coefficient for predicting the second component based on the first information, the second representation containing third information concerning at least the second component, and fourth information concerning at least one coefficient for predicting the first component based on the third information; and a processor for selecting use of at least one of the first representation and the second representation to recover the signal.

9. The apparatus of claim 8 wherein the at least one of the first representation and the second representation is selected based on a measure of corruption of the selected representation.

10. The apparatus of claim 9 wherein the first representation and the second representation are encoded in accordance with a forward error correction coding technique.

11. The apparatus of claim 10 wherein the measure is a function of a count of detections of errors in the selected representation, in accordance with the forward error correction coding technique.

12. The apparatus of claim 9 wherein the first representation and the second representation are received from a plurality of communication channels, respectively, the measure being a function of a signal-to-interference ratio afforded by the communication channel from which the selected representation is received.

13. The apparatus of claim 8 wherein the signal includes a stereo audio signal.

14. The apparatus of claim 13 wherein the first component includes a left channel signal of the stereo audio signal, and the second component includes a right channel signal thereof.

15. The apparatus of claim 8 wherein the first information concerns a combination of the first component and the second component.

16. The apparatus of claim 15 wherein the combination of the first component and the second component is adaptively determined.

17. The apparatus of claim 8 wherein the third information concerns a combination of the first component and the second component.

18. The apparatus of claim 17 wherein the combination of the first component and the second component is adaptively determined.

19. A system for communicating a signal which includes at least a first component and a second component, the system comprising:

a plurality of communication channels;

a transmitter for transmitting at least a first representation and a second representation of the signal through the communication channels, the first representation containing first information concerning at least the first component, and second information concerning at least one coefficient for predicting the second component based on the first information, the second representation containing third information concerning at least the second component, and fourth information concerning at least one coefficient for predicting the first component based on the third information; and a receiver for recovering the signal based on at least a selected one of the first representation and the second representation.

20. The system of claim 19 wherein the signal includes a stereo audio signal.

21. The system of claim 20 wherein the first component includes a left channel signal of the stereo audio signal, and the second component includes a right channel signal thereof.

22. The system of claim 19 wherein the communication channels are simultaneously available for transmitting the first representation and the second representation therethrough, respectively.

23. The system of claim 19 wherein the communication channels include satellite links.

24. The system of claim 23 wherein a third representation of the signal is transmitted through a selected one of the communication channels, the selected channel includes a terrestrial link.

25. A method for communicating a signal over a plurality of communication channels, the signal including at least a first component and a second component, the method comprising:

generating at least a first representation and a second representation of the signal, the first representation containing first information concerning at least the first component, and second information concerning at least one coefficient for predicting the second component based on the first information, the second representation containing third information concerning at least the second component, and fourth information concerning at least one coefficient for predicting the first component based on the third information; and transmitting the first representation and the second representation through the communication channels.

26. The method of claim 25 wherein the signal includes a stereo audio signal.

27. The method of claim 26 wherein the first component includes a left channel signal of the stereo audio signal, and the second component includes a right channel signal thereof.

28. The method of claim 25 wherein the first information concerns a combination of the first component and the second component.

29. The method of claim 28 wherein the combination of the first component and the second component is adaptively determined.

30. The method of claim 25 wherein the third information concerns a combination of the first component and the second component.

31. The method of claim 30 wherein the combination of the first component and the second component is adaptively determined.

32. A method for recovering a signal including at least a first component and a second component, the method comprising:

receiving at least a first representation and a second representation of the signal, the first representation containing first information concerning at least the first component, and second information concerning at least one coefficient for predicting the second component based on the first information, the second representation containing third information concerning at least the second component, and fourth information concerning at least one coefficient for predicting the first component based on the third information; and selecting use of at least one of the first representation and the second representation to recover the signal.

33. The method of claim 32 wherein the at least one of the first representation and the second representation is selected based on a measure of corruption of the selected representation.

34. The method of claim 33 wherein the first representation and the second representation are encoded in accordance with a forward error correction coding technique.

35. The method of claim 34 wherein the measure is a function of a count of detections of errors in the selected representation, in accordance with the forward error correction coding technique.

36. The method of claim 33 wherein the first representation and the second representation are received from a plurality of communication channels, respectively, the measure being a function of a signal-to-interference ratio afforded by the communication channel from which the selected representation is received.

37. The method of claim 32 wherein the signal includes a stereo audio signal.

38. The method of claim 37 wherein the first component includes a left channel signal of the stereo audio signal, and the second component includes a right channel signal thereof.

39. The method of claim 32 wherein the first information concerns a combination of the first component and the second component.

40. The method of claim 39 wherein the combination of the first component and the second component is adaptively determined.

41. The method of claim 32 wherein the third information concerns a combination of the first component and the second component.

42. The method of claim 41 wherein the combination of the first component and the second component is adaptively determined.

43. A method for communicating a signal over a plurality of communications channels, the signal including at least a first component and a second component, the method comprising:

transmitting at least a first representation and a second representation of the signal through the communication channels, the first representation containing first information concerning at least the first component, and second information concerning at least a first coefficient for predicting the second component based on the first information, the second representation containing third information concerning at least the second component, and fourth information concerning at least a second coefficient for predicting the first component based on the third information; and recovering the signal based on at least a selected one of the first representation and the second representation.

44. The method of claim 43 wherein the signal includes a stereo audio signal.

45. The method of claim 44 wherein the first component includes a left channel signal of the stereo audio signal, and the second component includes a right channel signal thereof.

46. The method of claim 43 wherein the communication channels are simultaneously available for transmitting the first representation and the second representation therethrough, respectively.

* * * * *